(12) United States Patent
Watanabe

(10) Patent No.: US 6,168,772 B1
(45) Date of Patent: *Jan. 2, 2001

(54) PROCESS FOR THE SELECTIVE OXIDATION OF CARBON MONOXIDE IN REFORMED GASES

(76) Inventor: Masahiro Watanabe, No. 2412-8 Wadamachi, Kofu-shi, Yamanashi (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/408,147

(22) Filed: Mar. 20, 1995

(30) Foreign Application Priority Data

Mar. 19, 1994 (JP) .................... 6-074515

(51) Int. Cl.$^7$ .................................... C01B 31/20
(52) U.S. Cl. .................. 423/247; 423/437.2; 429/17; 502/74
(58) Field of Search .................. 510/325, 338, 510/339; 423/437.2, 247

(56) References Cited

U.S. PATENT DOCUMENTS

| | | | |
|---|---|---|---|
| 3,631,073 | * 12/1971 | Cohn et al. | 252/376 |
| 5,244,852 | * 9/1993 | Lachman et al. | 502/66 |
| 5,258,340 | * 11/1993 | Augustine et al. | 502/60 |
| 5,292,991 | * 3/1994 | Lachman et al. | 585/850 |
| 5,432,021 | * 7/1995 | Wilkinson et al. | 423/437.2 |

OTHER PUBLICATIONS

Akubuiro et al, "Dispersion and Support Effects in Carbon Monoxide Oxidation over Platinum," 1985 (No Month) *Applied Catalysis*, 14, 215–227.*

* cited by examiner

*Primary Examiner*—Wayne Langel
(74) *Attorney, Agent, or Firm*—Arent Fox Kinter Plotkin & Kahn PLLC

(57) ABSTRACT

We have recently proposed special catalysts, Pt-supported zeolites, for the selective oxidation of carbon monoxide in reformed fuels from methanol or natural gas. They can be applied to polymer electrolyte fuel cells, of which Pt anode catalysts suffer serious poisoning by the trace amount of CO. In order to enhance the performance of the catalysts, the selective CO oxidation was examined over Pt—, Ru—, Pd—, Co—, and PtRu— supported zeolites in a large excess of $H_2$ with the addition of a low concentration of oxygen. It was found that Pt, Ru, and PtRu supported on mordenite can oxidize CO much more selectively than a conventional Pt-supported alumina catalyst. Ru/mordenite showed the highest selectivity of approximately 100% at 200° C. with a certain flow rate of the reactant. Pt-Ru/mordenite exhibited fairly high selectivity of 90% over a wide flow rate condition even at 150° C. Analyses with IR and QCM methods indicated that the selective CO oxidation on Pt—Ru/mordenite can proceed by so-called bi-functional mechanism via the surface reaction between CO and O atoms adsorbed on adjacent Pt and Ru sites.

7 Claims, 2 Drawing Sheets

PROCESS FOR THE SELECTIVE OXIDATION OF CARBON MONOXIDE IN REFORMED GASES

BACKGROUND OF THE INVENTION

This invention relates to a catalyst for selective oxidation of carbon monoxide in reformed gases of which a main component is a hydrogen gas employed as a fuel for such as a fuel cell and a process of the oxidation of carbon monoxide in reformed gases.

While a platinum based catalyst is employed in a solid polymer electrolyte fuel cell (PEMFC) as in a phosphoric acid fuel cell (PAFC), the solid polymer electrolyte fuel cell is operated under a low temperature (ordinarily at or below 100° C.) different from the phosphoric acid fuel cell so that the poisoning of a catalyst with carbon monoxide more seriously takes place. A reformed gas prepared by reforming methane or the like in the consideration of a cost is frequently employed as a supply source of hydrogen in a fuel employed in these fuel cells, but, for example, about 1% of carbon monoxide is contained in the reformed gas for PAFCs, which results in the poisoning of the electrocatalyst of the said polymer electrolyte fuel cells so as not to provide desired cell performances.

Because of this poisoning, in order to obtain the desired cell performances employing the reformed gas. It is required to supply the reformed gas after the amount of the carbon monoxide is reduced to one-hundredth of the original amount. In accordance with this concept, Gottesfeld et al. have proposed ① a process of oxidizing in advance coexisting carbon monoxide to nonpoisonous carbon dioxide by means of a γ-alumina supporting platinum (3% in weight) and ② a process of oxidizing coexisting carbon monoxide to carbon dioxide on the electrocatalyst of a fuel cell (M. T. Paffett, S. Gottesfeld et al., "The Treatment of CO Poisoning in Low Temperature Fuel Cells by the Injection of Oxygen or Air into the Anode Feed Stream", 1990 Fuel Cell Seminar Pre-Publication).

Since, however, the selectivity of the oxidation reaction with the oxygen is low in these reactions, a large amount of the hydrogen which is a main component of the reformed gas and is to be used as a fuel is concurrently oxidized and wasted so that the lowering of the fuel utilization is caused. The reason why the large amount of the hydrogen gas is oxidized is that the catalyst is exposed on the support of the γ-alumina and the ordinary electrocatalyst (carbon black) and onto the catalyst are adsorbed by the oxygen and carbon monoxide which is then oxidized to carbon dioxide and concurrently with this oxidation the hydrogen is also adsorbed and oxidized. Since the adsorption rate of the hydrogen is proportional to the partial pressure of the hydrogen in the gas phase, the amount of the hydrogen oxidized supposedly becomes large.

SUMMARY OF THE INVENTION

The present Invention has been made to overcome the above drawbacks. Accordingly, an object of the present invention is to provide a catalyst for selectively oxidizing carbon monoxide in reformed gases employed as a fuel of a fuel cell.

Another object of the invention is to provide a catalyst which enables the depression of an amount of hydrogen wasted due to oxidation thereof and maintains the fuel utilization efficiency in addition to the selective oxidation of the carbon monoxide.

A further object of the invention is to provide a process of preparing said catalyst.

A first aspect of the present invention is a catalyst for selective oxidation of carbon monoxide in reformed gases which comprises a support having apertures of which a diameter is a molecular level dimension and a catalyst supported thereon.

A second aspect of the present invention is a process of oxidation of carbon monoxide in reformed gases which comprises contacting a reformed gas containing a large amount of hydrogen and a small amount of carbon monoxide with a catalyst comprising a support having apertures of which a diameter is a molecular level dimension and a catalyst supported thereon while supplying oxygen for selectively oxidizing the carbon monoxide.

In accordance with these aspects, a small amount, usually at a concentration of about 1%, of carbon monoxide existing in original reformed gases can be selectively oxidized to nonpoisonous carbon dioxide by the function of the catalyst such as a platinum while depressing the waste of hydrogen due to its oxidation. Accordingly, when the reformed gases prepared according to the process of this invention is employed as a fuel of a fuel cell, substantially no poisoning occurs because only a small amount of the carbon monoxide is left, and the high cell performances and the high fuel utilization rate can be obtained because the hydrogen is not wasted. More than 90% of the introduced oxygen is employed only for the oxidation of the carbon monoxide so as to remarkably lower the decrease of the hydrogen due to its oxidation and when it is employed as a fuel of a fuel cell, the fuel utilization rate is not lowered.

DETAILED DESCRIPTION OF THE INVENTION

Figure 1:
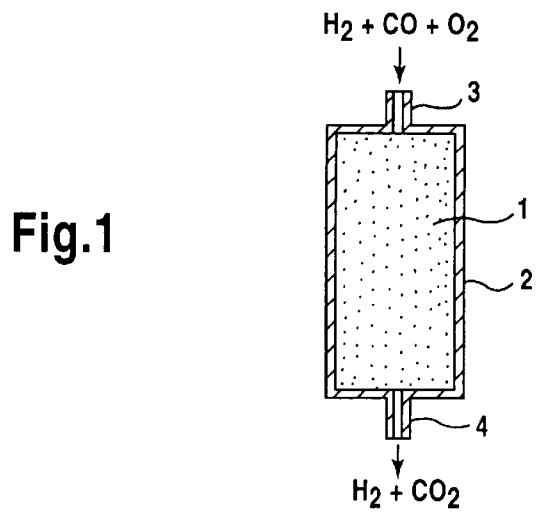
FIG. 1 is a schematic sectional view showing a first embodiment of a reaction vessel filled with a catalyst of the present invention.

When the support such as zeolite having apertures of which a diameter is between 0.4 and 2 nm is in contact with the supplied gas, the gas passes through the aperture while repeatedly colliding the aperture wall. Since the passing speed decreases with the increase of the weight of the molecule and a number of polar groups exist on the apertures of the support such as the zeolite, such a molecule as carbon monoxide which has a higher molecular weight and is a dipolar molecule is more readily adsorbed than such a molecule as hydrogen which is light and non-polar. Therefore, a residence time of the carbon monoxide and the oxygen is considerably longer than that of the hydrogen so that opportunities of the adsorption of the carbon monoxide and the oxygen onto such a catalyst as platinum supported on the walls in the apertures as ultrafine particles increase to promote the oxidation reaction of the carbon monoxide.

Among the supports available in the present invention, zeolite is most suitable considering the aperture size thereof which is desirably between 0.4 and 2 nm.

When the size is below 0.4 nm, the molecule of the carbon monoxide and the like is difficult to pass through the apertures. When, on the other hand, the aperture size is over 2 nm, the molecule of the carbon monoxide and the like is undesirably difficult to collide the aperture walls and to be adsorbed.

The contact temperature between the gas and the oxidation catalyst is desirably between 100 and 300° C., and, the amount of oxygen introduced is desirably 0.5 to 2 times in volume as large as that of the carbon monoxide existing in the reformed gas.

When the temperature is below 100° C., the reaction rate is considerably decreased, and when, on the other hand, it is over 300° C., the carbon monoxide selectivity is undesirably lowered. When a higher carbon monoxide selectivity is required, the catalyst and the gas may be contacted at a temperature between 100 and 250° C.

The oxygen amount of 0.5 time is the minimum amount required for completely oxidizing the carbon monoxide so that when the oxygen is less than 0.5 time, a part of the carbon monoxide remains unoxidized. When, on the other hand, the amount of oxygen introduced is over two times, the excess oxygen is likely to be employed for oxidizing the hydrogen to increase the amount of the wasted hydrogen. In order to more strictly depress the waste of the hydrogen, it is desirable to employ the amount of the oxygen 0.5 to 1 time as large as that of the carbon monoxide.

The catalyst supported may be a simple substance selected from platinum, palladium, rhodium, iridium, ruthenium, nickel, cobalt and iron, or a mixture or an alloy consisting of two or more metals selected therefrom.

Even when the reformed gas containing carbon monoxide plus oxygen is single-passed through the newly invented catalyst layer, a more preferable effect can be obtained compared with a conventional catalyst layer. Moreover, the loaded layer may be divided into two or more layers which are then connected in series and are passed the reformed gas. The oxygen is then subdivided and supplied to the said respective divided layers resulting in that the ratio of the oxygen employed for the hydrogen oxidation, because of the high carbon monoxide selectivity, is decreased to further elevate the carbon monoxide selectivity.

Figure 2:
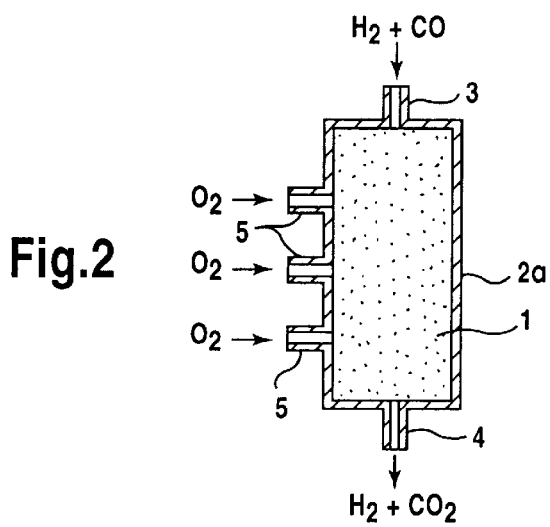
FIG. 2 is a schematic sectional view showing a second embodiment of a reaction vessel filled with a catalyst of the present invention.
Figure 3:
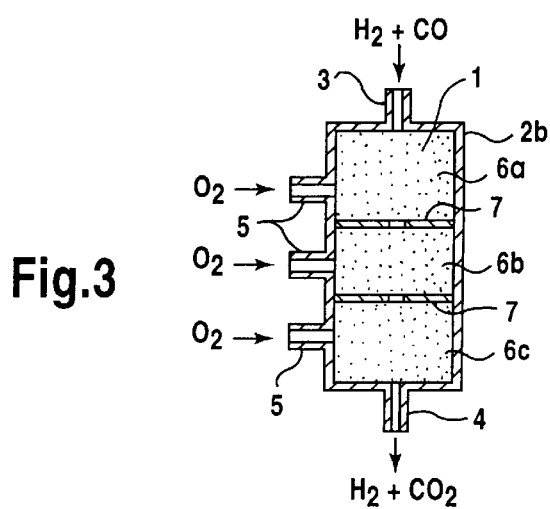
FIG. 3 is a schematic sectional view showing a third embodiment of a reaction vessel filled with a catalyst of the present invention.

FIGS. 1 to 3 exemplify three reaction vessels filled with the above catalyst.

In FIG. 1, a catalyst 1 is filled in a reaction vessel 2 having an inlet 3 and an outlet 4. A mixture of a reformed gas and oxygen is supplied to the reaction vessel 2 through the inlet 3, and carbon monoxide in the mixture is oxidized to carbon dioxide by the contact with the catalyst 2 so that the mixture of the hydrogen and the nonpoisonous carbon dioxide is taken out through the outlet 4.

In FIG. 2, a catalyst 1 is filled in a reaction vessel 2a having the inlet 3, the outlet 4 and oxygen supply ports 5 on its side surface. In this reaction vessel 2a, the reformed gas is supplied through the inlet 3, and the oxygen is subdivided and the respective subdivisions are supplied through the oxygen supply ports 5. In this embodiment, the mixture containing substantially no carbon monoxide can also be obtained.

In FIG. 3, a catalyst 1 is filled in a reaction vessel 2b having the inlet 3, the outlet 4, the oxygen supply ports 5 on its side surface and a plurality of partition walls 7 for dividing the interior into a plurality of catalyst chambers. In this reaction vessel 2a, the reformed gas is initially supplied to a first catalyst chamber 6a in which part of carbon monoxide is oxidized with oxygen supplied through the oxygen supply port 5. The mixture then passes in turn through a second catalyst chamber 6b, a third catalyst chamber 6c and a fourth catalyst chamber 6d, in each of which the rest of the carbon monoxide is oxidized.

EXAMPLE

An Example and a Comparative Example of this invention will be described. However, the present invention is not restricted thereby.

Example 1

To 200 ml of a bivalent platinum ammine salt solution was added and mixed 2 g of zeolite A [$Na_{12}(Al_1Sl_{12}O_{48})$, $27H_2O$] sufficiently converted into its $Na^+$ ion form (an amount of the platinum corresponding to 30% of all the amount of ion exchange was added) which was allowed to stand for 12 hours. After it was then filtered, washed, dried at 110° C. for two hours and solidified by means of pressing, it was classified employing a sieve such that the particles having 80 to 100 mesh were obtained. A reaction tube of which an inner diameter was 4 mm was filled with 0.1 g of these particles and this reaction tube was set in an electric furnace.

After $O_2$ was then supplied through the reaction tube for 60 minutes effecting oxidation while the reaction tube was heated to 500° C., the platinum ammine salt was converted into the metal platinum (the platinum loading rate at this stage was 6.4% in weight).

Mixed gases of hydrogen ($H_2$) and of carbon monoxide (CO) ($H_2/CO=99/1$) and oxygen ($O_2$) were introduced into the reaction tube at various mixing ratios employing a mass flow controller. A reaction product gas was introduced to a gas chromatography device in which the concentrations of $H_2$, CO and $O_2$ in the product gas were measured.

During this procedure, the reaction temperature was made to change between 150 and 350° C., the oxygen concentration was made to change between 0.5 and 2% and the contact time [=(void volume of catalyst loaded layer)/(supply rate of reaction gas)] was made to change variously so that the selective oxidation rate of CO was investigated.

The relations between the degrees of conversion from the carbon monoxide to the carbon dioxide and the reaction temperatures and between the CO selectivities and the reaction temperatures are shown in Table 1. [the mixed gas consisted of 98% of $H_2$, 1% of CO and 1% of $O_2$, and the $H_2$ selectivity was calculated as (100%—CO selectivity)].

From this Table, it can be recognized that the degree of conversion was maximum around 200 to 250° C. which reached to values over 90%. The CO selectivities of the oxidation reaction became large with the decrease of the temperature which reached up to 63% and the balance of 37% was employed for hydrogen oxidation.

TABLE 1

|  | Example 1 | | Comparative Example 1 | |
| --- | --- | --- | --- | --- |
|  | Maximum Conversion | CO Selectivity | Maximum Conversion | CO Selectivity |
| 150° C. | 97% | 63% | 85% | 42% |
| 200° C. | 96% | 55% | 93% | 41% |
| 250° C. | 95% | 46% | 83% | 39% |
| 300° C. | 86% | 40% | 60% | 32% |
| 350° C. | 60% | 30% | — | — |

Figure 4:
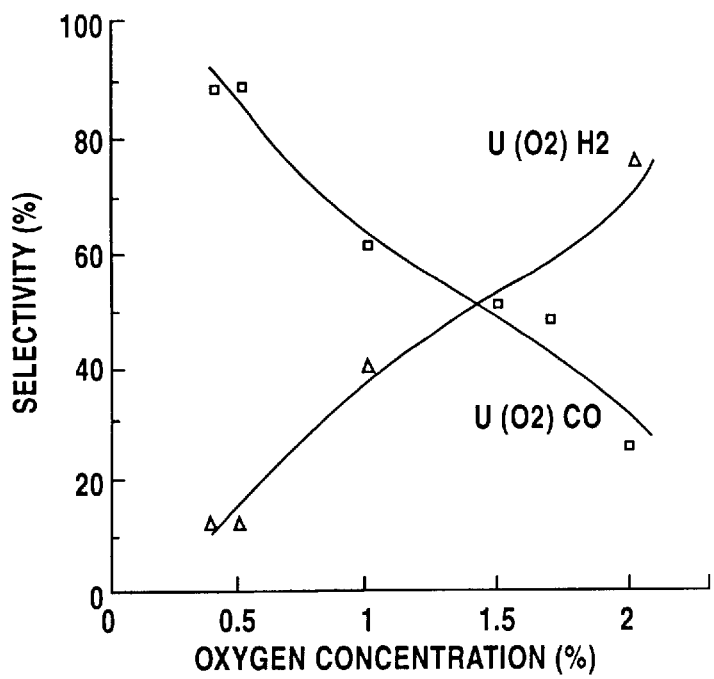
FIG. 4 is a graph showing the influence of an oxygen concentration on a selectivity of CO and of $H_2$ in Example 1.

Influences of the change of the oxygen concentrations at the carbon monoxide concentration of 1% and the reaction temperature of 200° C. on the selectivities are shown in FIG. 4 [U(O2)CO shows a ratio of the oxygen introduced which was employed for the oxidation of the carbon monoxide (CO selectivity) and U(O2)H2 shows a ratio of the oxygen introduced which was employed for the oxidation of the hydrogen]. The CO selectivity increased with the decrease of the O2 concentration such that U(O2)CO was 90% at 0.5%~O2 as shown in FIG. 4. Accordingly, 90% of the introduced oxygen was utilized for the oxidation of the carbon monoxide which existed at the concentration of only 1% in the hydrogen at the concentration of 99% so as to realize the remarkably high selectivities.

Comparative Example 1

After 2 g of a γ-alumina support (specific surface area of 160 m$^2$/g) prepared by molding and activating Gypnite manufactured through a Bayer process was added to 10 ml of a chloroplatinic acid aqueous solution (containing the platinum of 6.4% in weight), the particles having 80 to 100 mesh were obtained after drying and filtration in accordance with the procedures of Example 1. As in Example 1, a reaction tube was filled with 0.1 g of those particles followed by oxidation with oxygen and reduction with hydrogen to prepare a platinum metal supported alumina catalyst (loading rate was 6.4% in weight), Thereafter, an oxidation reaction of a mixed gas was carried out as in Example 1.

The relations between the degrees of conversion from the carbon monoxide to the carbon dioxide and the reaction temperatures and between the CO selectivities and the reaction temperatures are shown in Table 1. As apparent from Table 1, not only the degrees of conversion but also the selectivities at all the temperatures of Comparative Example 1 were lower than those of Example 1, and only less than half of the oxygen introduced was utilized for the oxidation of the carbon monoxide.

Figure 5:
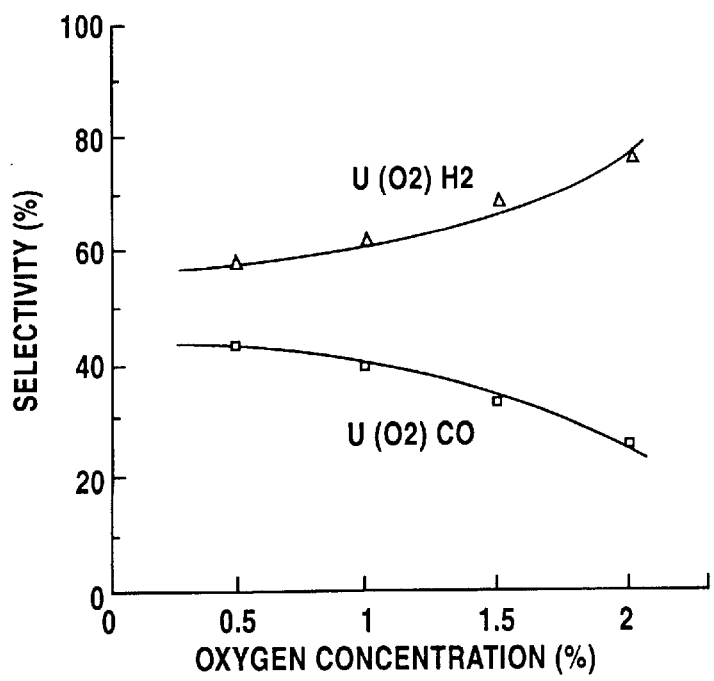
FIG. 5 is a graph showing the influence of an oxygen concentration on a selectivity of CO and of $H_2$ in Comparative Example 1.

Influences of the change of the oxygen concentrations at the carbon monoxide concentration of 1% and the reaction temperature of 200° C. on the selectivities are shown in FIG. 5.

In FIG. 5, the H2 selectivity exceeded the CO selectivity at the respective oxygen concentrations.

What is claimed is:

1. A process for the selective oxidation of carbon monoxide present in a reformed gas prior to the employment of the reformed gas as a fuel in a fuel cell, comprising contacting the reformed gas with oxygen in a reaction vessel in the presence of a platinum catalyst present on a zeolite support, wherein said catalyst consists essentially of a uniform mixture of said platinum and said zeolite support wherein said contacting takes place at a temperature between 100 and 300° C., said support has an aperture diameter between 0.4 and 2 nm, and said oxygen is admitted to the vessel through a plurality of multi-stage inlet passages contained in the vessel.

2. The process according to claim 1, wherein the oxygen is supplied in a volume amount of 0.5 to 2 times the volume of carbon dioxide present in the reformed gas.

3. The process according to claim 1, wherein the reformed gas passes through the reaction vessel in a flow direction and oxygen is admitted to the reaction vessel through said passages in a direction different from the direction of flow of the reformed gas.

4. The process according to claim 3, wherein said oxygen is admitted to the reaction vessel through said passages in a direction substantially perpendicular to the direction of flow of the reformed gas.

5. The process according to claim 1, wherein said process is carried out in a reaction vessel containing at least one internal partition wall thereby forming a plurality of internal catalyst chambers with oxygen being supplied to the catalyst chambers and wherein the reformed gas passes through said catalyst chambers such that carbon monoxide present in the reformed gas emerging from the first of such catalyst chambers is oxidized in a subsequent catalyst chamber.

6. The process according to claim 5, wherein the reformed gas passes through the catalyst chambers in a flow direction and the oxygen is supplied to the catalyst chambers in a direction different from the direction of flow of the reformed gas through the catalyst chambers.

7. The process according to claim 6, wherein said oxygen is admitted to the reaction vessel through said passages in a direction substantially perpendicular to the direction of flow of the reformed gas.

* * * * *